United States Patent Office 3,650,978
Patented Mar. 21, 1972

3,650,978
VINYL-MALEIC ACID THIOESTER OR THIO-ETHERESTER POLYMERS OR SALTS THEREOF AS EMULSIFYING AGENTS
Robert R. Chambers, Homewood, Henry V. Isaacson, Oak Forest, and David W. Young, Homewood, Ill., assignors to Atlantic Richfield Company
No Drawing. Original application Jan. 4, 1967, Ser. No. 607,150, now Patent No. 3,472,772, dated Oct. 14, 1969. Divided and this application Apr. 25, 1969, Ser. No. 840,884
Int. Cl. B01f 17/36
U.S. Cl. 252—356    12 Claims

ABSTRACT OF THE DISCLOSURE

A vinyl monomer (e.g., styrene)-maleic anhydride polymer is esterified with a thioalcohol or a hydroxythioether. The product is rendered water-soluble by formation of amine, ammonium or alkali metal salt thereof, and the water-soluble salt is used as an emulsifying aid in oil-water emulsions, e.g., mineral oil-based cutting fluids.

---

This application is a divisional application of Ser. 607,150, filed Jan. 4, 1967, now U.S. Pat. 3,472,772.

The present invention relates to thioalcohol-esterified and hydroxythioether-esterified vinyl monomermaleic anhydride polymers, to the ammonium, amine and alkali metal salts of such polymers, and to aqueous solutions of the polymer salts. It has now been found that vinyl monomermaleic anhydride polymers will react with thioalcohols and hydroxy-thioethers to yield thioester and thioetherester derivatives, respectively, of the polymers, which derivatives, in their water-soluble salt forms, are especially useful in cutting oil formulations. Also, certain metal salts of the sulfur-containing esters, e.g., tin salts, have been found to exhibit stabilizing effects in, for instance, polyvinyl chloride compositions, e.g., PVC plastisols.

The esterified polymers of the present invention can be prepared by esterifying the vinyl monomer-maleic anhydride polymer with a compound having the general formula

wherein R is a monovalent hydrocarbon radical of about 1 to 20, preferably about 1 to 12, carbon atoms and R' is a mono-valent radical selected from the group consisting of hydrogen and alkylols of about 1 to 24, preferably about 1 to 12, carbon atoms. Thus, suitable esterifying compounds are thioalcohols, known also as thiols and mercaptans, and hydroxythioethers, known also as thioetheralcohols. Preferably, R is alkyl. Illustrative esterifying compounds include, for example, methyl mercaptan, ethyl mercaptan, isooctyl mercaptan, ethylthioethanol, etc.

The reaction between the polymer and the esterifying compound takes place at the dicarboxylic anhydride sites of the polymer to form thioester or thioetherester linkages. Thus, the reaction of one mole of thioalcohol with sufficient vinyl monomer-maleic anhydride polymer to provide one mole of maleic anhydride units would yield a polymeric product having the following half-thioester of maleic acid units:

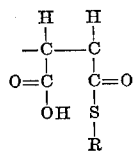

The percent, or extent of esterification of the polymer is a factor in determining the utility of the sulfur-containing, esterified polymers of the invention. By "percent esterification" is meant the overall percentage of total potential carboxyl groups on the polymer chains that are in the form of the thioester group, i.e.,

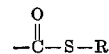

or in the form of the thioetherester group, i.e.,

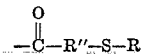

R representing the radical defined above and R" representing the divalent residue of the alkylol radical of a hydroxythioether. "Potential carboxyl groups" include carboxyl groups as such and groups capable of yielding the carboxyl group by hydrolysis and having the formula:

where X is hydrogen, hydrocarbyl, metal or carbon (e.g., as in the case of the anhydride). Thus, for instance, where 25% of the total potential carboxyl groups of the vinyl monomer-maleic anhydride polymer are esterified (25% esterification), the product is a polymer having 50% esterification based on half-esterification. The higher the percentage of esterification, the lower the solubility of the polymer in aqueous, alkaline media and the greater the organic solvent, e.g., hydrocarbon, solubility.

The present invention contemplates polymers which are esterified with the above sulfur-containing compounds in the range of about 5 to 100, preferably about 25 to 75 percent. Where it is desired to render the esterified polymer water-soluble, the present esterification is also important from the standpoint of leaving enough unreacted carboxyl groups to permit sufficient amine, alkali metal or ammonium salt formation. Further, it may be desired to allow sufficient carboxyl groups to remain free for subsequent cross-linking reactions.

The esterification reaction can be conducted by known methods. Often, temperatures of about 50° C. to 200° C., preferably about 100 to 160° C., can be employed. The reaction may be conducted in bulk or in the presence of suitable solvents such as, for example, xylene, toluene, or an excess of the esterifying sulfur-containing compound. The reaction proceeds without the additional presence of catalyst; however, such may be employed, if desired, and as suitable catalysts may be mentioned lithium acetate and sodium methoxide. Reaction time will vary according to reactant proportions, the presence or absence of catalysts and diluents, temperature, pressure, etc. The main consideration as regards reaction time, however, is the extent of esterification sought.

The esterified polymers of the present invention are rendered water-soluble by conversion of unreacted carboxyl groups of the copolymer to their amine, alkali metal or ammonium salt forms. As suitable amines may be mentioned the water-soluble, amines, for example, methyl amine, triethanolamine, etc. Preparation of the salt can be by known methods such as by the addition of the thioesterified or thioetheresterified polymer to a hot aqueous solution of ammonium hydroxide.

The polymer with which the sulfur-containing compounds are reacted to form the thioesters of thioetheresters of the present invention is a polymer of maleic anhydride and a polymerizable monovinyl compound of 2 to about 12 carbon atoms, these components being present in the polymer in a molar ratio of vinyl monomer to maleic anhydride of about 1 to 4:1, preferably about 1 to 3:1. Suitable vinyl compounds include, for instance, ethylene, propylene, isobutylene, butylene, pentylene, hexylene, heptylene, octylene, nonylene, decylene, dodecylene, methyl vinyl ether, ethyl vinyl ether, butyl vinyl ether, styrene, vinyl toluene, and the like. The preferred vinyl monomer is styrene. If desired, maleic acid can be used instead of maleic anhydride in formation of the polymer, and the use of the term "maleic anhydride" herein and in the claims is intended to include maleic acid.

The polymer contains repeating vinyl monomer and maleic anhydride units and, in unesterified form, may have an average molecular weight of about 400 to 18,000, preferably about 600 to 15,000. The melting point may generally range from about 80 to 300° C., and a 10% by weight solution of the polymer in acetone will generally exhibit a viscosity at 30° C. of up to about 2 centistokes, preferably less than about 1 centistoke.

Preparation of the vinyl monomer-maleic anhydride polymer can be by known methods. A preferred method is by solution polymerization where the monomers are polymerized in a suitable solvent employing as a polymerization catalyst a free-radical catalyst, such as a peroxide, preferably benzoyl peroxide, dicumyl peroxide, or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Typical properties of, for example, styrene maleic anhydride resins from which the thioesters or thioetheresters of the present invention can be prepared are as follows:

TABLE I

| Form | Resin— | | | |
|---|---|---|---|---|
| | A | B | C | D |
| Form | Powder | Powder | Powder | Powder |
| Average molecular weight | 1,600 | 1,700 | 1,900 | 400-600 |
| Melting range, ° C | 165-180 | 140-160 | 115-130 | 80-100 |
| Acid Number | 500 | 366 | 275 | 400 |
| Kinematic viscosity at 30° C. (in acetone, 10% concentration), centistokes | 0.67 | 0.73 | 0.78 | 0.5 |
| Ratio of styrene to maleic anhydride in polymer | 1:1 | 2:1 | 3:1 | 1:1 |

The water-soluble salts of the thioesterfied or thioetheresterfied polymers of the present invention are useful as emulsifying aids in hydrocarbon oil-based emulsifiable oils, which oils find utility, for example, in cutting, spraying and rust-preventing applications. The oils used as the base component are preferably mineral oils of lubricating viscosity and include, for instance, petroleum lubricating oils such as refined coastal and Mid-Continent oils. Refining may be acid-treatment, solvent extraction, hydrogenation or other procedures. Often the oils exhibit a viscosity from about 50 to 1200 SUS at 100° F., most preferably about 50 to 150 SUS at 100° F.

The water-soluble salt of the sulfur-containing esters of the present invention can be included in the emulsifiable oils in minor amounts, e.g., about 1 to 50, preferably at least about 5, percent by weight of the base hydrocarbon oil. In addition to the base oil and the ester derivative, the emulsifiable oil will often include one or more other additives such as rust and foam inhibitors, bactericides, etc. Water may initially be added in small amounts to form a concentrate which may be further diluted at time of use in a ratio of, say, up to about 200, preferably about 2 to 80 parts of water per one part of the emulsifiable oil composition.

The following examples, which are to be considered illustrative only and not limiting, describe the preparation of the thioesterified and thioetheresterified polymers of the present invention.

EXAMPLE I

Into a 500 ml. resin kettle was added a mixture of the styrene-maleic anhydride polymer (150 grams) identified in Table I as "Resin A" and 2-methyl-2-heptanethiol, known synonymously as tert-octylmercaptan, (55 grams). The kettle was immersed in an oil bath at 200° C. and kept there for five hours with stirring; the resin thus treated was then precipitated in acetone and dried. The resulting product was an approximately 50% half-thioester of the styrenemaleic anhydride polymer. The product analyzed: 71.46 wt. percent C, 6.30 wt. percent H and 3.05 wt. percent S.

The ammonium salt was prepared by addition of the thioester to a warm (50° C.) solution of ammonium hydroxide. The ammonium salt of the thioester was then precipitated in acetone and dried.

The thioester salt was tested as an emulsion aid in cutting oils; the results are given in Table II to follow.

EXAMPLE II

A mixture of the styrene maleic-anhydride polymer (101 grams) identified in Table I as "Resin A" and ethyl thioethanol (26 grams) was heated in a resin pot with agitation at 200° C. for five hours. After precipitation in acetone and drying, the ammonium salt of the hydroxythioether-esterified polymer was prepared by reaction with hot, aqueous ammonium hydroxide. The salt analyzed: 62.29 wt. percent C, 7.07 wt. percent H and 4.96 wt. percent C. Table II also lists test results on cutting oils containing this salt as an emulsion aid.

TABLE II.—TAPPING TEST COMPARISONS

| Sample Number | 7009 | 7002 | 7003 |
|---|---|---|---|
| Cutting oil base,[1] weight percent | 12.5 | 12.5 | 12.5 |
| Water, weight percent | 87.5 | | |
| Aqueous solution (1 weight percent) of ammonium salt of Example I, weight percent | | 87.5 | |
| Aqueous solution (1 weight percent) of ammonium salt of Example II, weight percent | | | 87.5 |

| Metal | Tap Number | Tapping torque,[2] inch pounds | | |
|---|---|---|---|---|
| AISI-1042-Exp. 8695 | 6 | 122 | 129 | 122 |
| AISI-8620-Heat 51219 | 9 | 122 | 114 | 118 |
| AISI-9310-Heat 69712 | 8 | 140 | 134 | 138 |
| 303 Stainless-Exp. 8695 | 7 | 166 | 167 | 165 |

[1] Ingredients: (weight percent): Petroleum sulfonate, 25; Oleyl oleate, 35; Diethylene Glycol, 3; Mineral Lube Oil, 37.
[2] 1/2—13 NC spiral point plug tap 55 ROM, 0.440 hole (62% thread), posdick setup.

The data presented in the above table indicate the value of the ammonium salts of the thioesterified and hydroxythioether-esterified polymers of the present invention as emulsion aids in cutting oil compositions used to cool and lubricate metal working operations on No. 8620 and No. 9310 steel.

It is claimed:
1. An esterified styrene-maleic anhydride polymer having a molar ratio of styrene to maleic anhydride of about 1 to 4:1 and an unesterified molecular weight of about 400 to 18,000, wherein about 5 to 100 percent of the potential carboxyl groups in said polymer are esterified with a compound corresponding to the formula:

R—S—R' wherein R is a monovalent hydrocarbon radical of about 1 to 20 carbon atoms and R' is a monovalent radical selected from the group consisting of hydrogen and alkylols of about 1 to 24 carbon atoms.

2. The esterified polymer of claim 1 wherein R is alkyl.

3. The esterified polymer of claim 2 wherein said compound is 2-methyl-2-heptanethiol.

4. The esterified polymer of claim 2 wherein said compound is ethylthioethanol.

5. The esterified polymer of claim 2 wherein the molar ratio of styrene to maleic anhydride is approximately 1:1.

6. The esterified styrene-maleic anhydride polymer of claim 1 wherein 25 to 75 percent of the potential carboxyl groups in said polymer are esterified.

7. A water-soluble salt of the esterified polymer of claim 6 selected from the group consisting of amine, alkali metal, and ammonium salts thereof.

8. An aqueous solution of the water-soluble salt of claim 7.

9. The ammonium salt of the esterified polymer of claim 6 when the esterification compound is 2-methyl-2-heptanethiol.

10. An aqueous solution of the salt of claim 9.

11. The ammonium salt of the esterified polymer of claim 6 when the esterification compound is ethylthioethanol.

12. An aqueous solution of the salt of claim 11.

References Cited
UNITED STATES PATENTS

| | | | |
|---|---|---|---|
| 2,615,845 | 10/1952 | Lippincott et al. | 252—56 |
| 2,694,685 | 11/1954 | Bartlett | 252—56 |
| 2,806,842 | 9/1957 | Gerecht et al. | 252—357 X |
| 2,892,852 | 6/1959 | Koenig et al. | 252—356 X |
| 3,235,526 | 2/1966 | Williams | 252—356 X |

RICHARD D. LOVERING, Primary Examiner

U.S. Cl. X.R.

252—357, 400, 402; 260—45.75 K, 78.5 T, 485 J